United States Patent
Areh et al.

(10) Patent No.: US 7,144,181 B2
(45) Date of Patent: Dec. 5, 2006

(54) JOINING DEVICE AND KITCHEN APPLIANCE FITTED WITH THE JOINING DEVICE

(75) Inventors: Marko Areh, Radlje Ob Dravi (SI); Henrik Pavlovic, Ljubno Ob Savinji (SI); Igor Zibret, Smartno Ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/791,549

(22) Filed: Mar. 1, 2004

(65) Prior Publication Data

US 2004/0165946 A1    Aug. 26, 2004

Related U.S. Application Data

(63) Continuation of application No. PCT/EP02/09461, filed on Aug. 23, 2002.

(51) Int. Cl.
*B25G 3/18*    (2006.01)
(52) U.S. Cl. .................. 403/109.3; 403/329
(58) Field of Classification Search ........... 403/11, 403/109.3, 280, 281, 282, 315, 319, 329; 99/495; D7/665, 666; 292/95, DIG. 11; 24/457, 458; 411/21, 22, 182, 508, 913
See application file for complete search history.

(56) References Cited

U.S. PATENT DOCUMENTS 2,913,230 A * 11/1959 Hutchins ................ 241/282.2
4,034,889 A    7/1977 Hammes et al.
5,100,046 A *   3/1992 Allegrucci
5,577,779 A    11/1996 Dangel
5,609,758 A    3/1997 Hwang
5,678,953 A *  10/1997 Usui ..................... 403/329
5,816,733 A *  10/1998 Ishikawa et al. ........ 403/329
6,155,741 A *  12/2000 Took .................... 403/329
6,640,694 B1 * 11/2003 Brezovnik et al. ........ 99/348

FOREIGN PATENT DOCUMENTS

GB       486367      6/1938
JP     03162252 A    7/1991

\* cited by examiner

*Primary Examiner*—Daniel P. Stodola
*Assistant Examiner*—Victor MacArthur
(74) *Attorney, Agent, or Firm*—Craig J. Loest; Russell W. Warnock

(57) ABSTRACT

A joining device joins first and second bodies. The joining is simple and can be well-maintained, between a first and a second body that are, for example, parts of a food processor, whereby the first wall forms the bottom and the second wall is an outer wall. The first wall of the first body extends substantially at a right angle to the second wall of the second body. A detent projection, which is placed on an inner side of the first wall that is encircled by the second body, is pushed into a detent opening inside the wall by the force exerted by a connection device, particularly a screw, that is joined to the first body.

10 Claims, 2 Drawing Sheets

JOINING DEVICE AND KITCHEN APPLIANCE FITTED WITH THE JOINING DEVICE

CROSS-REFERENCE TO RELATED APPLICATION

This application is a continuation, under 35 U.S.C. § 120, of copending international application No. PCT/EP02/09461, filed Aug. 23, 2002, which designated the United States; this application also claims the priority, under 35 U.S.C. § 119, of German patent application No. 101 42 508.2, filed Aug. 30, 2001; the prior applications are herewith incorporated by reference in their entirety.

BACKGROUND OF THE INVENTION

Field of the Invention

The present invention relates to a joining device for attaching a first body, which can be inserted into a second body.

There are many options for connecting together two bodies. Apart from screw connections, detent connections offer the advantage that the connections can easily become loosened when both bodies are to be detached from each other for example for repair purposes.

SUMMARY OF THE INVENTION

It is accordingly an object of the invention to provide a joining device and a kitchen appliance fitted with the joining device that overcomes the above-mentioned disadvantages of the prior art devices of this general type, which is simple to construct.

In a joining device of the type initially described this task is solved by a first wall of the first body extending substantially at a right angle to a second wall of the second body, and being fitted with a detent boss, which is disposed on an inner side of the first wall encircled by the second body, and which is pushed into a detent opening by a force exerted by a connection device connected to the first body.

The inventive configuration of the joining device succeeds in applying axial forces from the first body to the second body. This produces a good and stable connection in an axial direction between both bodies.

In a particularly advantageous configuration of the invention the detent boss is disposed on a spring connected to the first wall. The detent boss is then pressed or pushed into an assigned detent opening by the connection device, when the latter is placed in the first wall of the first body, resulting in a secure though easily detachable connection between the first and the second body.

In a particularly suitable variant of the invention the spring is connected monobloc to the first wall. The spring can thus be manufactured in the same work procedure as the first wall. The spring and the wall are formed of either plastic or metal. When the spring and the wall are formed of plastic, they can be manufactured as a monobloc injected-molded article.

A joining device, in which the spring is disposed at an acute angle to the second wall, is particularly suitable. By introducing the connection device through the first wall of the first body the spring is tensed and at the same time the detent boss disposed on the spring is pressed into the detent opening.

The detent boss engages advantageously in a detent opening designed as a sack hole bore.

It proves advantageous if the connection device is configured as a screw, a pin or a bolt. Due to the connection device a fast connection is established between the first and the second body.

Particular stability is achieved by the joining device if the first body has a support wall on the inside of the first wall, and running substantially vertically to the first wall, and if the connection device between the support wall and the spring is screwed or inserted into the first body.

The invention also relates to a kitchen appliance, which is fitted with a joining device. The above-mentioned advantages can be utilized in the kitchen appliance fitted thus with the first and the second body. This structuring contributes to producing a kitchen appliance quickly and to being able to take it apart easily for repairs.

The invention is particularly suited to a kitchen appliance, in which the first body is a floor part, the first wall is a floor plate, the second body is a sheathing part and the second wall is a sheathing wall.

In particular, the invention is suited to a kitchen appliance having a circular floor plate, representing the front side of a substantially cylindrical, conical or truncated structure of a kitchen appliance, in particular a kitchen appliance such as a citrus press.

Using the inventive joining device forms the housing of the kitchen appliance. The space in the inside of the housing of the kitchen appliance can be utilized rationally, since the attachment between the front-side floor plate and the sheathing wall occupies little room only. Due to the type of installation there are interfering edges neither inside nor outside.

Other features which are considered as characteristic for the invention are set forth in the appended claims.

Although the invention is illustrated and described herein as embodied in a joining device and a kitchen appliance fitted with the joining device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
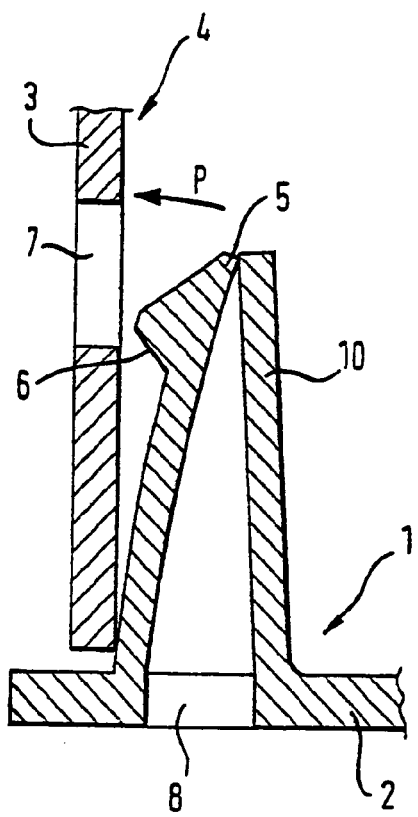
FIG. 1 is a diagrammatic, cross-sectional view of a joining device without a connection device according to the invention.

Referring now to the figures of the drawing in detail and first, particularly, to FIG. 1 thereof, there is shown a body 1 that has a wall 2. The body 1 can be inserted from below into a mantel or annular wall 3 of a body 4.

Formed on the wall 2 is a spring 5, in such a way that it protrudes into an interior formed by the wall 2 and the wall 3 along with other non-illustrated structural elements. The spring 5 with the wall 3 forms an acute angle. On its front end it has a detent boss 6, which is facing a detent opening 7, formed in the wall 3. The detent opening 7 is either an opening passing through the wall 3 or a sack hole bore.

Figure 2:
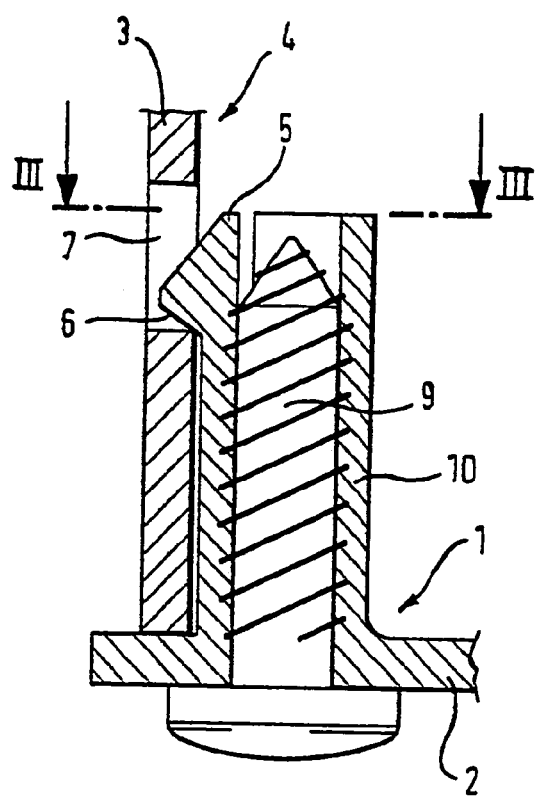
FIG. 2 is a diagrammatic, section view of the joining device according to FIG. 1 together with the connection device.
Figure 3:
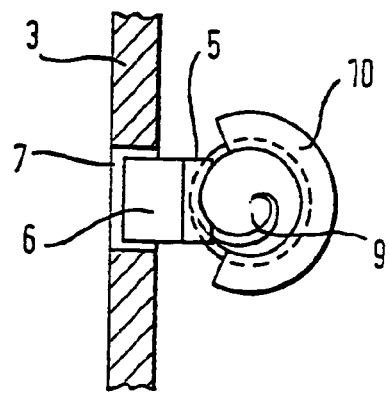
FIG. 3 is a diagrammatic, plan view of the joining device with the connection device taken along the line III—III shown in FIG. 2.

In another embodiment, not illustrated here, the form of the detent opening is especially adapted to the form of the detent boss 6. But it is fully acceptable if, as shown in FIGS. 1 and 2, the detent boss 6 is taken up fully by the detent opening 7.

The wall 2 is fitted with an opening 8, through which a connection device 9 can be inserted. A screw 9, whereof the helical winding engages in corresponding, preformed grooves on the side of the spring 5 averted from the wall 3, is particularly suitable.

In order to create a good hold by the connection device 9 in the wall 2, and for the spring 5 to be pressed with its detent boss 6 particularly securely into the detent opening 7, by pushing in the connection device, in particular by turning in the screw 9, a support wall 10 is preferably provided, which holds in position the screw 9 or a pin inserted in through the opening 8, and prevents the recoil force of the spring 5 from deflecting the screw 9 or the pin against the direction of an arrow P from the wall 3.

The support wall 10 for example has a cross-section of the segment of a circle. This effectively ensures that the screw is held adequately. The support wall 10 is also preferably connected monobloc to the wall 2.

Figure 4:
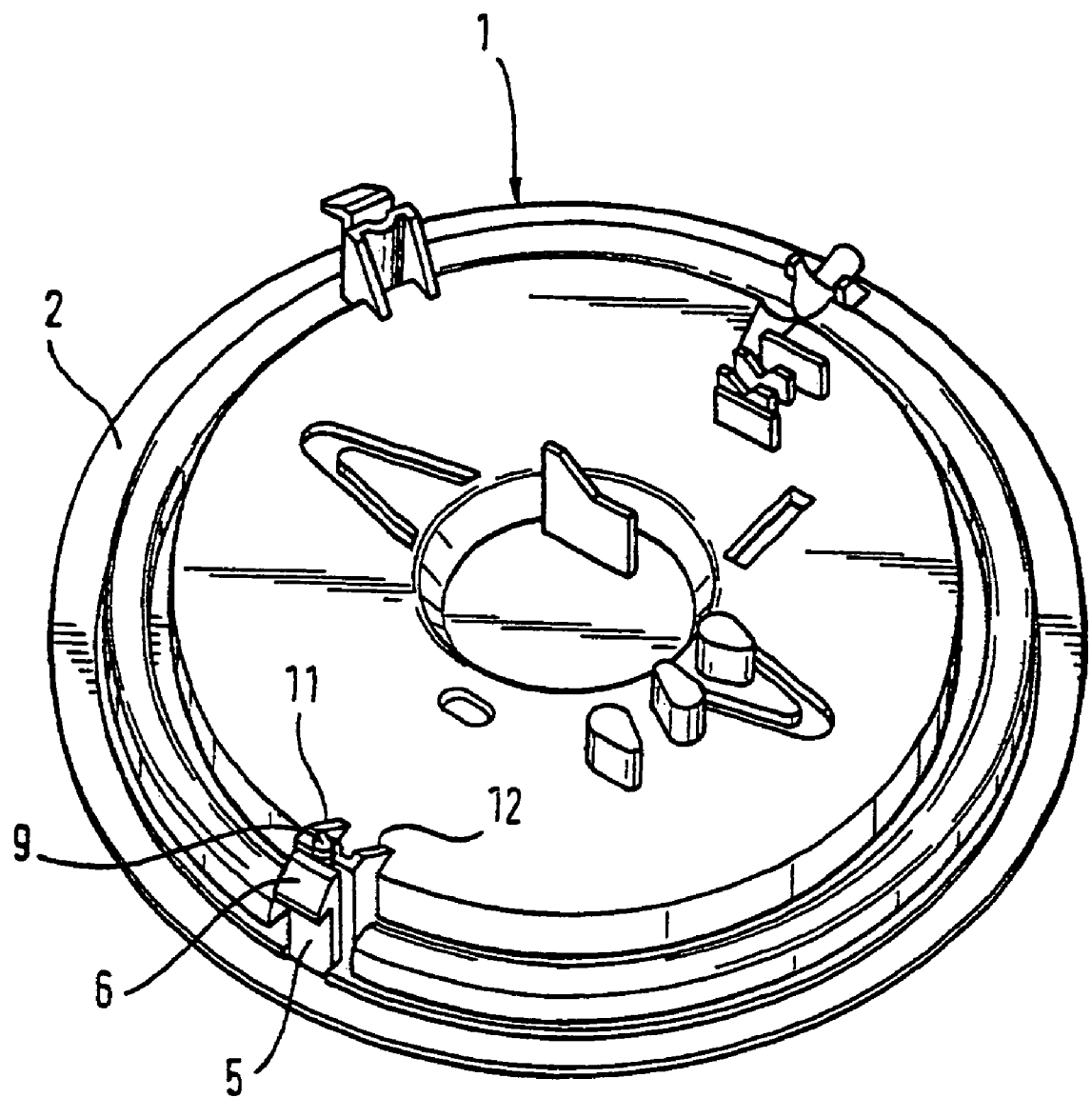
FIG. 4 is a diagrammatic, perspective view of a floor plate of a kitchen appliance.

In an embodiment of the invention the wall 2 (FIG. 4) of the body 1 forms a floor plate. Two support walls 11 and 12, separated from one another, instead of the support wall 10 support the screw 9.

The invention enables easy and secure connection between the first body 1 and the second body 4, which are for example parts of a kitchen appliance, whereby the first wall 2 forms the floor and the second wall 3 is a sheathing wall. The first wall 2 of the first body 1 extends substantially at a right angle to the second wall 3 of the second body 4. The detent boss 6, which is disposed on an inner side of the first wall 2 encircled by the second body 4, is pressed into the detent opening 7 in the wall 3 by the force exerted by the connection device connected to the first body 1, in particular the screw 9.

We claim:

1. A joining device for attaching a body, comprising:
    a first body having a first wall with an inner side and extending substantially at a right angle to a second wall of a second body, said first body being inserted into said second body, said second body being a single unitary construction;
    a plurality of detent bosses connected to said inner side of said first wall, said plurality of detent bosses each being pressed by force into a respective one of detent openings formed in the second body, and said plurality of detent bosses being encircled by the second body in a pressed-in state;
    a plurality of connection devices each disposed in said first body for exerting the force on a respective one of said detent bosses;
    wherein said first body has a plurality of springs connected to said first wall and said plurality of detent bosses are each disposed on a respective one of said plurality of springs; and
    wherein said first body has a plurality of support walls on an inside of said first wall, and substantially vertical to said first wall, and said plurality of connection devices which are disposed between said plurality of support walls and said plurality of springs can be screwed or inserted into said first body.

2. The joining device according to claim 1, wherein said spring is disposed at an acute angle to the second wall.

3. The joining device according to claim 1, wherein said spring is connected monobloc to said first wall.

4. The joining device according to claim 1, wherein the detent opening is a sack hole bore and said detent boss is configured for engaging the sack hole bore.

5. The joining device according to claim 1, wherein said connection device is selected from the group consisting of screws, pins and bolts.

6. A joining device for attaching to a first body, which is inserted into a second body, said second body being a single unitary construction, the first body having a first wall extending substantially at a right angle to a second wall of the second body, the joining device comprising:
    a plurality of detent bosses connected to an inner side of the first wall and said plurality of detent bosses each being pressed by force into a respective one of detent openings formed in the second body, said plurality of detent bosses being encircled by the second body in a pressed-in state;
    a plurality of connection devices each disposed in the first body for exerting the force on a respective one of said detent bosses, each of the plurality of connection devices maintaining the corresponding detent boss in the pressed-in-state in the corresponding opening to engage the first body to the second body;
    a plurality of springs connected to the first wall and said plurality of detent bosses each being disposed on a respective one of said plurality of springs; and
    wherein the first body has a plurality of support walls on an inside of the first wall, and disposed substantially vertical to the first wall, and said plurality of connection devices which are disposed between the plurality of support walls and said plurality of springs can be screwed or inserted into the first body.

7. The joining device according to claim 6, wherein said spring is disposed at an acute angle to the second wall.

8. The joining device according to claim 6, wherein said spring is connected monobloc to the first wall.

9. The joining device according to claim 6, wherein the detent opening is a sack hole bore and said detent boss is configured for engaging the sack hole bore.

10. The joining device according to claim 6, wherein said connection device is selected from the group consisting of screws, pins and bolts.

* * * * *